United States Patent
Strauss et al.

(10) Patent No.: US 6,535,580 B1
(45) Date of Patent: Mar. 18, 2003

(54) SIGNATURE DEVICE FOR HOME PHONELINE NETWORK DEVICES

(75) Inventors: Steven E. Strauss, Orefield, PA (US); John T. Holloway, Atherton, CA (US); Jason Alexander Trachewsky, Palo Alto, CA (US); Lixi Wu, San Jose, CA (US)

(73) Assignee: Agere Systems Inc., Allentown, PA (US)

( * ) Notice: Subject to any disclaimer, the term of this patent is extended or adjusted under 35 U.S.C. 154(b) by 112 days.

(21) Appl. No.: 09/606,157

(22) Filed: Jun. 29, 2000

Related U.S. Application Data

(60) Provisional application No. 60/145,737, filed on Jul. 27, 1999, and provisional application No. 60/172,163, filed on Dec. 17, 1999.

(51) Int. Cl.$^7$ ................................................. H04M 1/24
(52) U.S. Cl. ............................... 379/27.01; 379/27.03; 379/27.05; 379/29.03; 379/1.03; 379/1.04
(58) Field of Search .................. 379/22.03, 24, 379/26.01, 26.02, 27.01, 27.03, 27.04, 29.01, 27.05, 29.11, 93.09, 93.11, 1.03, 1.04, 2

(56) References Cited

U.S. PATENT DOCUMENTS

| | | |
|---|---|---|
| 4,350,849 A | 9/1982 | Ahuja |
| 4,388,501 A | 6/1983 | Ahuja |

(List continued on next page.)

FOREIGN PATENT DOCUMENTS

| | | |
|---|---|---|
| GB | 2 256 332 | 12/1992 |

OTHER PUBLICATIONS

International Preliminary Examining Authority, PCT Written Opinion, Aug. 3, 2001.

*Primary Examiner*—Rexford Barnie
(74) *Attorney, Agent, or Firm*—William H. Bollman

(57) ABSTRACT

Signature apparatus and techniques that make home networking devices, e.g., in-Home Phoneline Network (herein referred to as "HPN") devices, isolation filters, network interface devices, etc., detectable by commercially available metallic loop termination (MLT) test equipment. The invention also provides a method of testing a telephone line for the existence of a signature circuit identifying a home network. The home network signature circuit includes a series combination of a voltage breakdown device (e.g., Zener diodes) and an impedance (e.g., 200K ohm resistor). In operation, the home network signature circuit shunts the tested subscriber line loop with a voltage-dependent impedance in the presence of an appropriate test voltage exceeding 80 volts. Different high voltage thresholds of the voltage breakdown portion and/or different resistance values of the shunt impedance can be implemented in the home network signature device to produce uniquely detectable signatures. In this way, it is possible to remotely differentiate between various types of home network devices if the various types of home network devices include known voltage thresholds and/or shunt impedances. Loop qualification for services such as VDSL could include an automated remote scan from a central office for home network signature devices being served by telephone lines, e.g., existing in the same binder. To sense each of the parallel connected home network signature devices, the test equipment may preferably be made sensitive to the threshold voltage, not to the shunt impedance. The home network signature circuit may simply reside between the tip and ring on an HPN adapter. The home network signature circuit is preferably functional whether or not the network device is powered up. The home network signature circuit, in response to the activation energy signal exceeding a predetermined threshold above 80 volts, will drive an appropriate current back onto the telephone line.

35 Claims, 6 Drawing Sheets

DC: HPNA SIGNATURE CIRCUIT

U.S. PATENT DOCUMENTS 4,807,277 A * 2/1989 Perry .......................... 379/29
4,852,145 A * 7/1989 Bevers et al. ................. 379/27
5,357,556 A * 10/1994 Dresser ....................... 379/27
5,483,573 A    1/1996 Steenton et al.
5,848,150 A * 12/1998 Bingel ........................ 379/399
6,301,227 B1 * 10/2001 Antoniu et al. ............... 379/29
6,301,337 B1 * 10/2001 Scholtz et al. ................ 379/27
6,389,110 B1 *  5/2002 Fischer et al. ............. 379/1.04

* cited by examiner

DC:HPNA SIGNATURE CIRCUIT

DC:HPNA SIGNATURE CIRCUIT

SIGNATURE DEVICE FOR HOME PHONELINE NETWORK DEVICES

This application claims priority from U.S. Provisional Appls. No. 60/145,737, filed Jul. 27, 1999, entitled "Home Networking Devices With Signature Circuit", and No. 60/172,163, filed Dec. 17, 1999, entitled "Signature Device For "In Home Phoneline Networking Transceivers", the entirety of which are expressly incorporated herein by reference.

BACKGROUND OF THE INVENTION

1. Field of the Invention

The invention relates generally to the field of networking. More particularly, it relates to the field of home networking, as employed in coupling electronic devices to each other, such as via home telephone lines.

2. Background

Home Networking is a new segment of the networking marketplace that is poised for rapid growth. Achieving the goals needed to make home networking a market success is a challenging task, however. The nascent home networking market growth will depend on the emergence of high-speed broadband access as a catalyst as well as on the availability of robust, low cost, easy to install standardized home networking equipment. Technical analysis has demonstrated that there is little system margin available for achieving the desired rates and robustness if a trouble-free consumer experience is desired. To enrich the consumer experience it is critical to consider mechanisms in the system that can be employed to support simple to use remote diagnostic tools in these emerging systems.

Home networking utilizes the telephone wiring within a household as a communication cable for use by networked devices within the home (e.g., a computer to a printer). However, the same inside telephone wiring may simultaneously carry several categories and/or types of signals, analog and/or digital in a frequency division multiplexed (FDM) topology. For instance, a single telephone line may be used to carry plain old telephone service (POTS), ISDN, and/or xDSL services such as ADSL and/or VDSL.

FIG. 4 shows a spectrum utilization of POTS, HPN, and various xDSL services arranged in a frequency division multiplexed topology.

In particular, as shown in FIG. 4, Plain Old Telephone Service (POTS) exists in the 0–4 kHz region, xDSL service is present from 25 kHz to approximately 2.2 MHz (depending on the definition of "x"), and the Home Networking spectrum occupies 5.5–9.5 MHz for HPN V1.x technology and 4.75–9.25 MHz for the emerging HPN V2 technology. The spectral allocation for the VDSL services is not yet established but it is expected to use the 26 kHz to 12 MHz region. The HPN signals occupy a spectrum which is higher in frequency than POTS, ISDN, ADSL and VDSL.

Although HPN communications are not intended for locations outside the customer's premises, some level of the HPN signal may be present on the subscriber loop pair (i.e., telephone line) that services the premise's telephone wiring. Normally this does not cause a problem to the telephone company because the HPN signal is almost always attenuated below the ambient noise floor before reaching the central office (CO) end of the subscriber loop.

FIG. 5 shows the source and existence of cross talk between an HPN signal and a VDSL signal in a common binder.

In particular, as shown in FIG. 5, where the subscriber loop pair is combined with other pairs into a cable, the potential exists for crosstalk into an adjacent pair. For instance, where adjacent pairs in a binder group carry VDSL services, and the downstream VDSL signal overlaps the HPN band, an HPN signal may appear as crosstalk in the receiver of the VDSL modem.

Since the frequency plan for VDSL is not yet established, it is difficult to definitively estimate the impact of HPN on VDSL. The severity and frequency of occurrence of such potential crosstalk is highly dependent on many variables, not yet accurately captured in deployment models. While further study may be required in this area, analysis performed to date indicates that the probability of interference into the VDSL service by HPN terminals does exist at least in some instances.

It is widely believed that the primary technical solution to VDSL-HPN crosstalk is the installation of a Network Isolation Filter (NIF) between the premises wiring and the outside subscriber loop. Such a filter blocks transmission of signals at 4 MHz and higher, but would pass signals under 4 MHz (providing for POTS, ISDN and ADSL).

FIG. 6 shows the use of a network isolation filter (NIF) on a subscriber loop (i.e., telephone line) installed at the customer's premises.

One of the difficulties faced by service providers before they can install a network isolation filter or other device to correct a problem is in identifying the source of a problem in response to a customer's complaint, e.g., a complaint that a subscriber's VDSL services are not operating correctly. As a result, numerous test and fault isolation systems have been developed for testing the operability of various components in the telephone network to determine if the problem resides in the customer premise equipment (CPE), in the line drop connecting the CPE to the switching system, or elsewhere in the telephone network system. These test and fault isolation systems are readily available to telecommunication service providers.

For instance, in one test technique described by the Home Phoneline Networking Alliance ("HPN") 1.0 and 2.0 specifications, a PSD mask that extends from 4 to 10 MHz is used. HPN signals are imposed by the test equipment on the existing telephone wiring inside a dwelling or office, and are used for local communication between HPN stations.

It is important to consider that the emerging "in-home" networking technology is being targeted as a consumer grade service. As such, any design goals must consider the "technology challenged" consumer and require "out of the box" functionality. In the case of "in-home" networking via existing telephone cable (HPN), the expectation from the consumer simply is that the technology will function properly and require little more than installing a telephone cable into an available telephone jack in the home. Furthermore, it is typically expected that the technology will provide a path to install upper level protocols and drivers with no network configuration, required by the consumer. This model obviously assumes that no "truck roll" occurs requiring an in-home service call by a qualified service technician.

HPN devices can be used without prior installation of a NIF. HPN technology has been designed to be robust in the face of noise coupled into the premises wiring from the subscriber loop, such as Amateur Radio Service RFI, crosstalk from adjacent loops with other HPN devices, and even crosstalk from VDSL. HPN operation is optimized, however, with the provisioning of a NIF. However, the average consumer can not be expected to install the NIF within the residence.

There are likely to be several situations that will result in NIFs being successfully introduced:

1) Installation on the subscriber's line of broadband access services such as ADSL or VDSL that employ a splitter (which also functions as a NIF).
2) Provisioning with alternate POTS services that derive a local POTS interface for the premises wiring from a broadband gateway or network termination unit.
3) Telephone operating company installation of an NIF to remediate VDSL interference as part of ongoing loop-plant maintenance procedures. This may be accomplished with an "add-on" NIF filter, or via upgrade of the subscriber's NID with one that has been designed with an integrated HPN NIF.

In any event, it is preferred that the consumer need not install an NIF filter themselves. To this end, there is a need for apparatus and techniques which allow a telephone company to detect, isolate, and correct effects of home networking on the telephone system.

SUMMARY OF THE INVENTION

In accordance with the principles of the present invention, a home network telephone line signature circuit comprises a voltage breakdown element having a breakdown in excess of 80 volts. An impedance is placed in series with the voltage breakdown element. The voltage breakdown element and the impedance are adapted for placement in series across a telephone line supporting a home network.

A method of indicating a presence of a home network device on a telephone line in accordance with another aspect of the present invention comprises sensing a voltage level of an injected energy signal on the telephone line. If the sensed voltage level exceeds at least 80 volts, a shunt impedance is activated across the telephone line.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
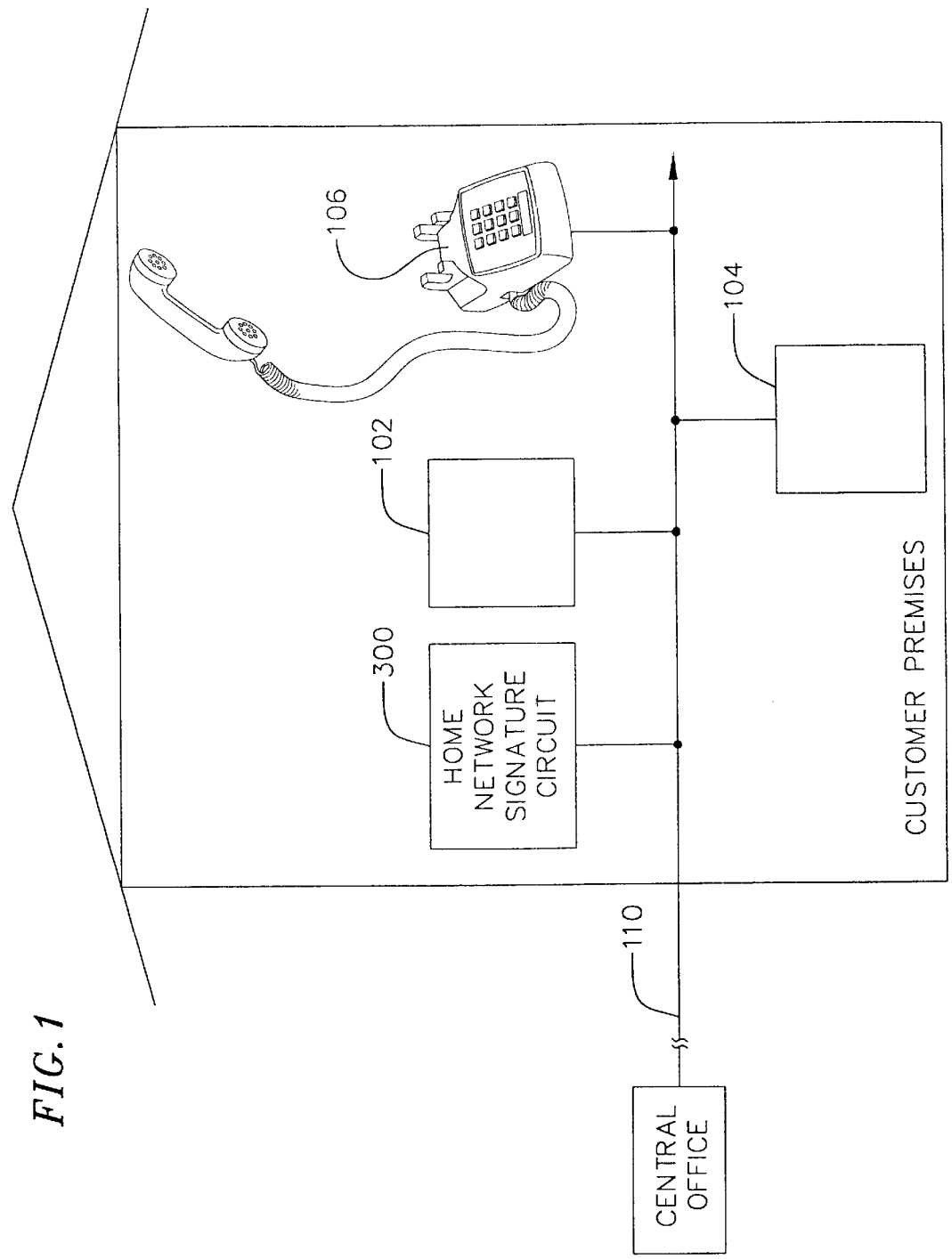
FIG. 1 shows a home network signature circuit utilized within a customer premises, in accordance with the principles of the present invention.

The present invention provides identifying or signature apparatus and techniques that make home networking devices, e.g., in-Home Phoneline Network (herein referred to as "HPN") devices, detectable by commercially available metallic loop termination (MLT) test equipment. While the disclosed embodiments relate specifically to HPN devices in particular, the principles of the present invention relate generally to all home network devices utilizing spectrum above that used by ordinary telephone service (i.e., above 4 kHz) on telephone wiring in a home or small office.

The present invention enables telephone operating companies to put in place simple, effective test identification, isolation and maintenance procedures using existing in-premises cable plant equipment to efficiently identify and upgrade appropriate subscriber lines which support home networking devices (e.g., HPN devices) having one or more signature circuits connected thereto, in accordance with the principles of the present invention. For instance, subscriber lines supporting home network equipment identified manually by a telephone technician, or automatically using scan equipment at a central office, may be scheduled for a technician to install an appropriate network isolation filter (NIF).

The test may be performed from a suitable location on site or remote from the customer premises. For instance, the test may be performed from a remote location such as from a central office (CO) facility, from a local but non-invasive location such as from the junction box outside a customer's premises, and/or from a telephone jack inside the customer's premises.

The invention also provides a method of testing a telephone line for the existence of a signature circuit identifying a home network. The disclosed test is performed over ordinary telephone line interfaces.

In an ideal world, perhaps all telephone lines would be outfitted with a network interface filter. However, it may be impractical to rebuild the entire loop plant with NIFs. Rather, it is preferred that only those subscriber lines that have home network (e.g., HPN) technology be targeted, and/or only those subscriber lines that co-exist with an affected service such as VDSL in the same binder pair be targeted, to result in manageable maintenance operations. Needless to say, identification of subscriber lines supporting home networking is potentially a valuable marketing tool for Local Exchange Carriers (LECs) that offer other services, e.g., broadband residential services.

Generally speaking, the identification of those telephone lines used to support a home network (e.g., an HPN) can be accomplished in one of two ways: using a manual or automated registration procedure, and/or using a test signature circuit in one or more home network device.

In particular, a telephone line having a home network (e.g., an HPN) established thereon can be identified using a manual, on-line (or other type) registration procedure that develops a database of subscriber phone numbers (and thus telephone lines) that have a home network installed. An on-line registration service may even link the more sophisticated user to information about home networking that will motivate the user to take appropriate action themselves to improve their service experience, e.g., by installing an NIF themselves.

Alternatively, in accordance with the principles of the present invention, a signature circuit may be implemented in one or more home network device, or otherwise connected to the relevant telephone line which supports a home network. If the signature circuit is installed within a home network device, the signature circuit is preferably functional whether or not the network device is powered up. The signature circuit may be connected to the relevant telephone line (e.g., by plugging it into an RJ-11 or other type telephone jack) separate from a network device, in accordance with the principles of the present invention.

In operation, a telephone test technician (or automated central office equipment) may apply predetermined energy signals to the tip and ring leads of a customer subscriber line, and measure a response from devices connected to the telephone line (e.g., one or more home network devices including a signature circuit in accordance with the principles of the present invention). The home network signature circuit, in response to the activation energy signal exceeding a predetermined voltage threshold, will drive an appropriate current signal back onto the telephone line.

The disclosed test method may apply the predetermined energy signal to the telephone line in a predetermined sequence, together with appropriate delay periods therebetween, e.g., 10 to 100 ms. The telephone technician (or automated central office equipment) makes voltage measurements of the voltage across the tip and ring leads of the telephone line at appropriate delay times after each energy signal.

The test signals are preferably of a low frequency (under 20 kHz), would appear rarely, and would not interfere with ISDN, ADSL or HPN transmissions. Moreover, the test signals may be applied when POTS devices are "on-hook".

The voltage measurements are compared to, e.g., limit values identified from a suitable DC characteristic curve to determine if a signature circuit exists on that tested wire pair, indicating, e.g., the existence of a home network on that particular telephone line. If the voltage measurements reach appropriately established limit values identified on the DC characteristic curve appropriate for the particular signature circuit, e.g., for a particular delay after the energy signal was applied, then it can be concluded that there is a very strong likelihood that a signature circuit is connected to the relevant telephone line, indicating, e.g., that a home network is utilizing the telephone line.

These 'signature' response signals will be seen even if a network isolation filter is installed, since the test signals use audio frequencies that are not blocked by the network interface filter. False matches can be filtered out, either by (a) cross checking a provisioning database that records the prior installation of a network interface filter, or (b) equipping the network interface filter with a unique signature of its own which can be detected by the test equipment.

Existing LEC maintenance procedures employ special test equipment that can insert test signals onto loops, and make precise electrical measurements. These units are sometimes referred to as "metallic loop test" (MLT), "metallic test access unit" (MTAU) or "loop test equipment". The units can detect line faults (open circuits, shorts to ground), corroded connections, loading coils, bridge taps and can even measure the number of "ringers" on the subscriber's line. Such otherwise conventional test units may be used by telephone technicians to test a particular telephone line for the existence of a signature circuit, in accordance with the principles of the present invention.

The test equipment may be located in the central office, in remote terminal cabinets, or carried by a telephone technician to a work site or junction box. Automated access may be provided to a bank of telephone lines (e.g., at a central office) so that computer-controlled, automated scans of telephone lines for detection of signature circuits in accordance with the principles of the present invention can be conducted.

FIG. 1 shows a home network signature circuit 300 utilized within a customer premises, in accordance with the principles of the present invention.

In particular, as shown in FIG. 1, a home network signature circuit 300 is placed in connection with a telephone line 110 of a customer's premises. The telephone line 110 also serves as a wired connection between home network devices 102, 104 (e.g., a computer and printer, respectively), and also to provide POTS to a telephone 106. While the home network signature circuit 300 is shown separately connected to the telephone line 110, the home network signature circuit 300 may alternatively be implemented internal to one or both shown network devices 102, 104.

Signature devices are used in broadband services. The present invention extends the use of signature devices to indicate the internal use of home networking devices (which are not typically provisioned by a telephone company).

Figure 2B:
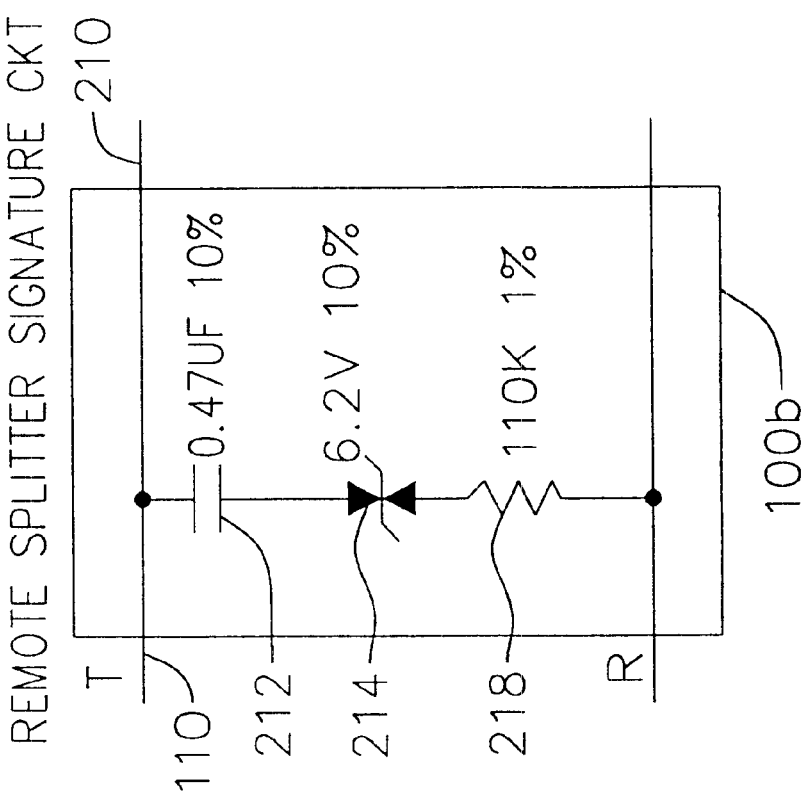
FIGS. 2A and 2B show signature circuits used for broadband services (e.g., ADSL) for a central office splitter (FIG. 2A) and a remote splitter (FIG. 2B), as proposed for ADSL POTS splitters in Annex E.1.7 of the T1.413 specification.
Figure 2A:
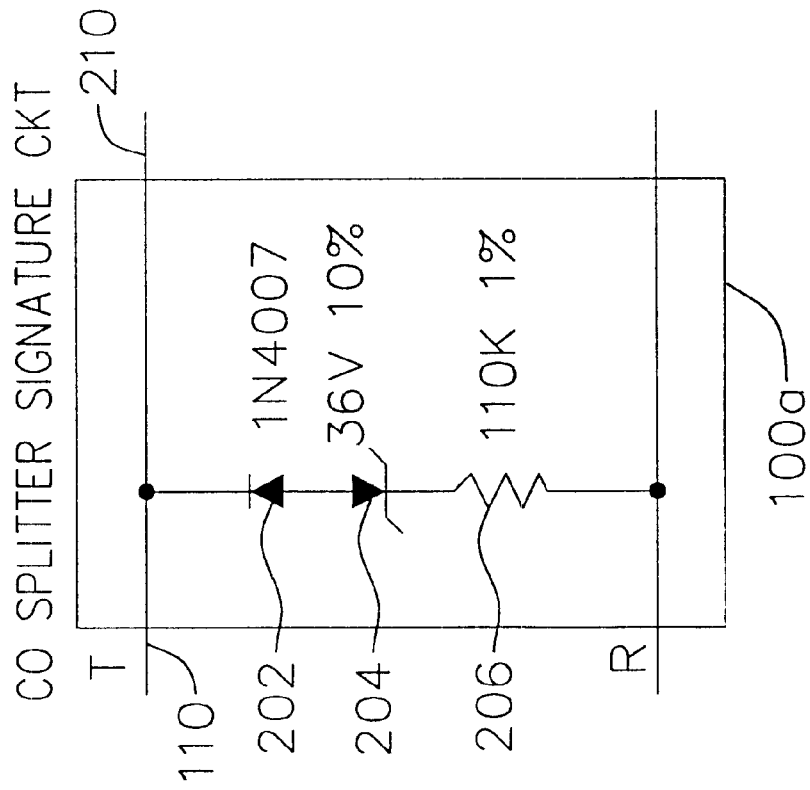

As background for signature devices that may be used in broadband services, FIGS. 2A and 2B show signature circuits used for broadband services (e.g., ADSL) for a central office splitter (FIG. 2A) and a remote splitter (FIG. 2B), as proposed for ADSL POTS splitters in Annex E.1.7 of the T1.413 specification.

In particular, FIG. 2A shows a series connection of a diode 202, a Zener diode 204, and an impedance such as a resistor 206, across the tip and ring of the relevant telephone line 110. The anode of the diode 202 is connected to the tip of the telephone line 110, while the cathode of the diode 202 is connected to the cathode of the Zener diode 204. In the disclosed embodiment, the diode 202 is a 1N4007, the Zener diode has a 36 volt clamp voltage, and the impedance is 110 Kohms.

FIG. 2B shows a series connection of a 0.47 uF capacitor 212, a 6.2 volt bi-directional clamping device 214, and a 110 Kohm impedance 218.

The present inventors realized the applicability of signature circuits provisioned by telephone companies in, e.g., technician installed network isolation filters, for use in home network devices. The signature circuits are ideally implemented in each home network device, relieving the user of any installation concern, and avoiding the need for a telephone technician.

Figure 3A:
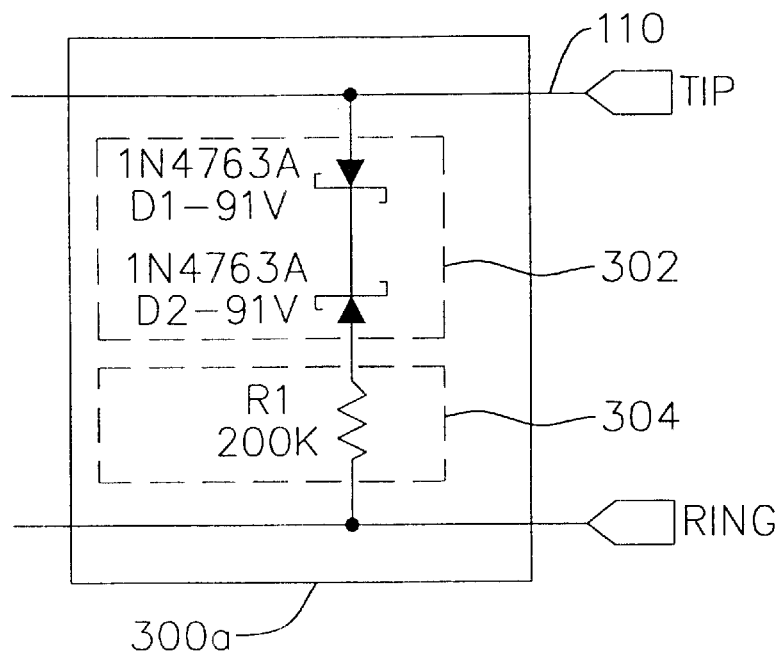
FIGS. 3A and 3B show exemplary DC home network signature circuits that can be used, e.g., in the front end of an HPN transceiver, in accordance with the principles of the present invention.
Figure 3B:
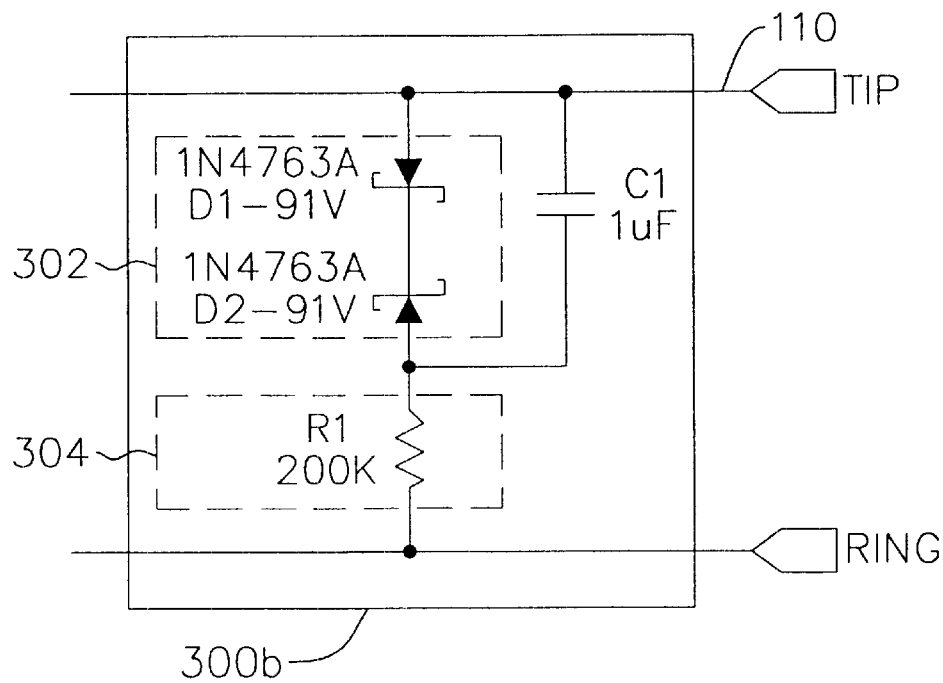
Figure 4:
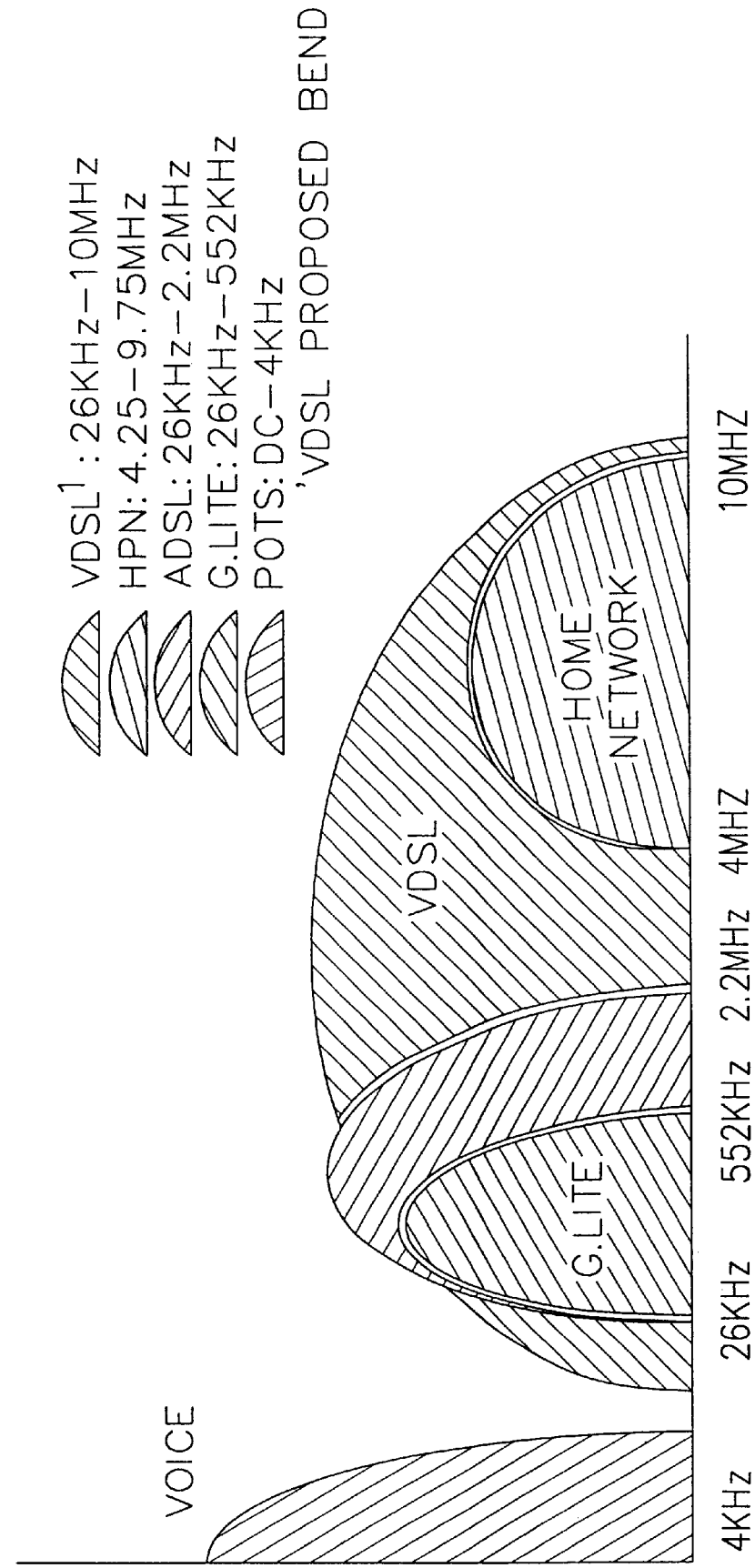
FIG. 4 shows a spectrum utilization of POTS, HPN, and various xDSL services arranged in a frequency division multiplexed topology.
Figure 5:
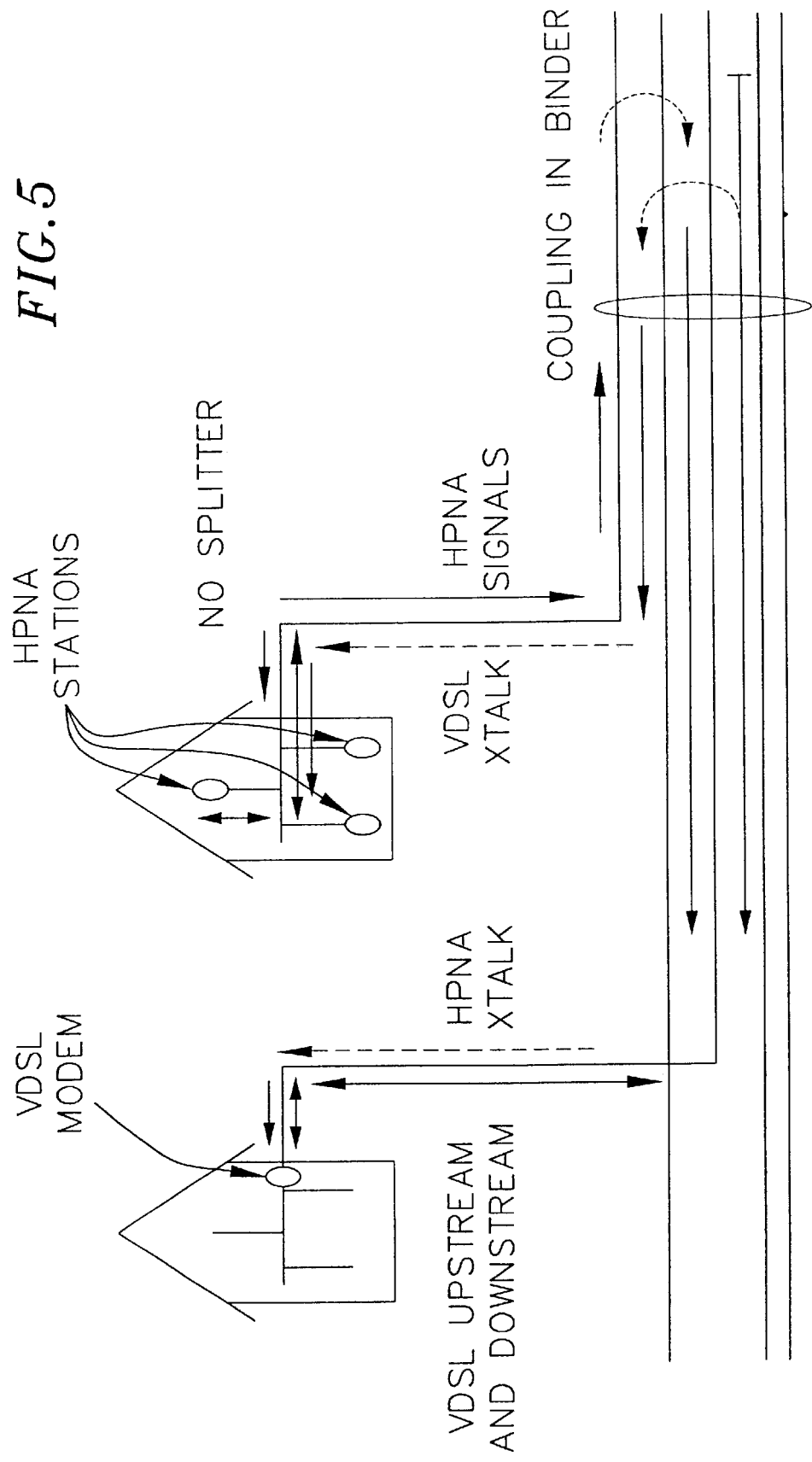
FIG. 5 shows the source and existence of cross talk between an HPN signal and a VDSL signal in a common binder.
Figure 6:
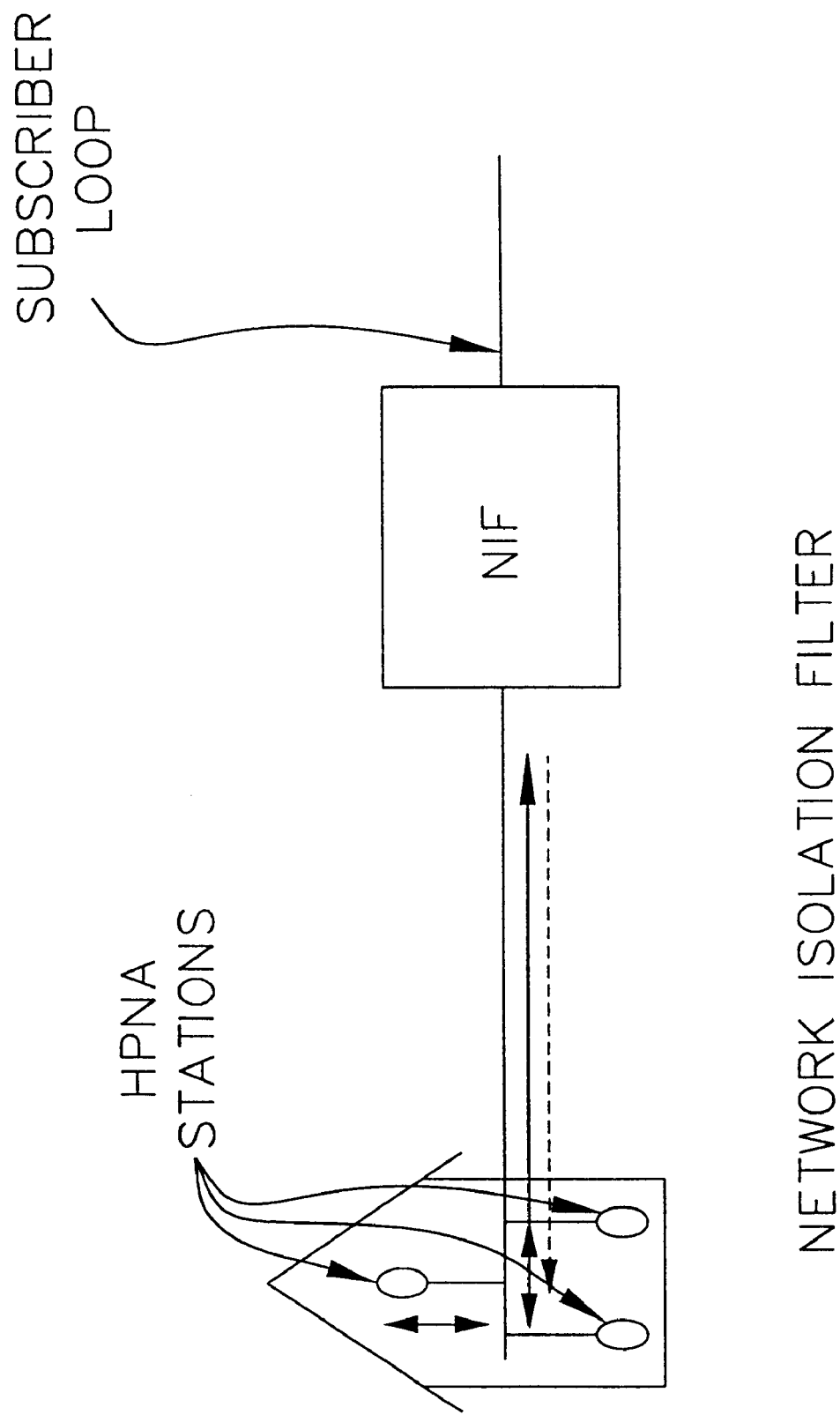
FIG. 6 shows the use of a network isolation filter (NIF) on a subscriber loop (i.e., telephone line) installed at the customer's premises.

FIGS. 3A and 3B show exemplary passive home network signature circuits 300a, 300b that can be used, e.g., in the front end of a home network device transceiver, in accordance with the principles of the present invention.

In particular, as shown in FIGS. 3A and 3B, the home network signature circuit 300a, 300b include a series combination of a voltage breakdown device 302, and an impedance 304.

In the disclosed embodiment, the voltage breakdown device 302 comprises anode-to-anode Zener diodes D1, D2. The Zener diodes D1, D2 preferably have a high avalanche voltage threshold to avoid other commonly-used signatures. For instance, the particular Zener diodes D1, D2 used in the exemplary circuits shown in FIGS. 3A and 3B are 1N4763A devices having an avalanche or clamping threshold of 91 volts.

Thus, particular importance is placed on the higher voltage level of the breakdown of the Zener diodes D1, D2. In particular, because of the existence of signature devices in broadband services having lower voltage breakdown threshold levels, it is preferred that the breakdown voltage levels of the Zener diodes D1, D2 be at least 80 volts.

Common Zener diodes are in abundant supply at about 82 volts, but with given tolerances (e.g., plus or minus 10%). A worst case scenario of 82 volts less a 10% tolerance would net an actual breakdown voltage of as low as 73.8 volts, making a common 82 volt Zener diode having 10% tolerance less than ideal for use in a signature circuit for a Home network in accordance with the principles of the present invention.

Another common value for standard Zener diodes is 91 volts which, considering the tolerances and non-linearity of Zener diodes, is suitable for use in a signature circuit in accordance with the principles of the present invention. Thus, FIGS. 3A and 3B show the use of commonly available 91 volt Zener diodes with common tolerances and non-linearities in an example signature circuit for a Home network.

Of course, commonly available Zener diodes (e.g., 82 volts) could be screened to guarantee an actual breakdown threshold of at least 80 volts. Alternatively, a custom or other Zener diode or other voltage breakdown device having an actual voltage threshold of at least 80 volts would be acceptable to 'sign' the response signal at that particular voltage level, in accordance with the principles of the present invention.

The impedance 304 may simply include a resistor R1 across the tip and ring of a relevant telephone line 110. Because of the relatively high voltage level of the Zener diodes D1, D2, it is preferred that the resistance R1 be relatively high. Moreover, if more than one home network signature circuit 300a, 300b is placed in parallel across the telephone line 110, the amount of the shunt impedance 304 will be significantly reduced. While the disclosed embodiments of FIGS. 3A and 3B show a resistor of 200 Kohms, it is preferred that the resistance of the shunt impedance 304 be at least about 110 Kohms. However, while the disclosed embodiments of FIGS. 3A and 3B utilize a 200 Kohm resistor R1, particular applications may implement other values of resistance or impedance, within the scope of the present invention.

While not absolutely necessary, as shown in the embodiment of FIG. 3B, a capacitor C1 may be placed in parallel across the series connection of the anode-to-anode Zener diodes D1, D2. The capacitor C1 helps smooth out non-linearities which are typically inherent in avalanche breakdown devices. Thus, if non-linear distortion of AC signals is a concern, a high voltage capacitor C1 of, e.g., ~1 $\mu$F, may be connected in parallel with the two Zener diodes D1, D2, but it is believed that this may not be required to meet the isolation objectives, and/or may add cost to an otherwise inexpensive home network signature circuit 300b.

The signature circuits of FIGS. 3A and 3B can be detected by varying an applied DC voltage from the central office, and then measuring a response current. Without the presence of a voltage signal of at least 91 volts in the disclosed embodiment, the shunt impedance 304 will effectively be open-circuited. However, in the presence of an injected energy signal in excess of 91 volts, current will be allowed to flow through the shunt impedance 304. It is the measurement of this current flowing through the shunt impedance 304 which 'signs' or indicates the presence of the home network signature circuit 300a, 300b.

It is preferred that the particular circuit elements implemented in the home network signature devices 300a, 300b avoid appearing like a ringer equivalent. A ringer equivalent is approximately a 0.5 $\mu$F capacitor in series with a 15–80 Kohm resistor, as viewed by MLT equipment.

In operation, the home network signature circuit 300 shunts the subscriber line loop 110 with a voltage-dependent impedance in the presence of an appropriate test voltage. The threshold of the non-linear components D1, D2 in the home network signature circuit 300 is higher than the levels of ordinary signal voltages that represent voice, ISDN, ADSL or HPN services. Thus, otherwise conventional test and isolation equipment can be used to probe telephone lines with special test signals that exceed the threshold of the signature circuits, which then appear as a finite impedance that can be measured.

Different voltage thresholds of the voltage breakdown portion 302 and/or different resistance values of the shunt impedance 304 can be implemented in the home network signature device 300 to produce uniquely detectable signatures. In this way, it is possible to remotely differentiate between various types of home network devices if the various types of home network devices include known voltage thresholds and/or shunt impedances.

If all network devices included an appropriate home network signature device 300 in accordance with the principles of the present invention, then the LEC would have a reliable and efficient method for identifying subscriber lines having home network devices supported thereby.

It is envisioned that automated scans for the 'signatures' from home network signature devices 300 in accordance with the principles of the present invention could be included in normal loop plant maintenance procedures. The information gathered, coupled with the information from home network user registrations, would yield a highly accurate database of home network deployment in a given service area.

Furthermore, loop qualification for services such as VDSL could include an automated scan for home network signature devices being served by telephone lines existing in the same binder. If home network signature devices 300 are discovered, implying that home network devices (e.g., HPN devices) are present within and sharing the binder pair with the VDSL service, then appropriate steps can be taken to minimize the affects of HPN and VDSL interaction (e.g., to minimize or eliminate altogether crosstalk). For instance, given that HPN and VDSL sharing space within the same binder group has the potential to degrade both services, isolation could lead to the installation of a network isolation filter to remediate a potential problematic loop.

The disclosed home network signature devices 300 respond to an appropriate test signal even if the relevant (or all) network devices are powered OFF, which is important to take full advantage of the provided remote detection.

Furthermore, a given subscriber loop may have several home network devices, and therefore 2 to N home network signature circuits 300 may be used in parallel to remotely indicate further information regarding the home network, e.g., the number and even the types of home network devices connected. To sense each of the parallel connected home network signature devices 300, the test equipment may preferably be made sensitive to the threshold voltage, not to the shunt impedance. Thus, different level voltage breakdown devices (all preferably above 80 volts) may be used, each to indicate a different type of network equipment.

The present invention achieves many advantages. For example, scans for home network signature devices 300 can be included in normal loop plant maintenance procedures. The information gathered, coupled with information from home network user registrations, can yield a highly accurate database of home network deployment in a given service area. Also, loop qualification for other services such as VDSL can include a scan for home network signature devices in the same binder. Moreover, maintenance procedures triggered by CPE management functions that monitor loop quality and signal to noise ratio (SNR) can be used to trigger scans for home network signature devices 300. In any of these cases, a problematic loop can be remediated by the installation of an appropriate network isolation filter.

The disclosed home network signature circuit 300 can be retrofitted onto existing product designs based on the Home-PNA™ 1.x and 2.0 specifications and emerging ITU-T Recommendation G.pnt.f without any significant (if any) change to the HPN silicon. The home network signature circuit 300 simply resides between the tip and ring on an HPN adapter.

References herein to "HPN" relate to home phoneline networks in general, as well as to specifications drafted by the Ban organization HomePNA™. In the future an HPN standard may be established that may or may not be based on a specification drafted or ratified by the HomePNA organization. Use of the term "HPN" as used herein relates both to HomePNA specifications as well as to any national or international HPN standard established, e.g., by ITU.

While the invention has been described with reference to the exemplary embodiments thereof, those skilled in the art will be able to make various modifications to the described embodiments of the invention without departing from the true spirit and scope of the invention.

What is claimed is:

1. A telephone line signature circuit, comprising:
   a voltage breakdown element having a given breakdown threshold; and
   an impedance in series with said voltage breakdown element;
   said voltage breakdown element and said impedance being adapted for placement in series across a telephone line to provide a unique signature representing a home network.

2. The telephone line signature circuit according to claim 1, wherein:
   said given breakdown threshold of said voltage breakdown element is at least 80 volts.

3. The telephone line signature circuit according to claim 1, wherein:
   said given breakdown threshold of said voltage breakdown element is about 82 volts.

4. The telephone line signature circuit according to claim 1, wherein:
   said given breakdown threshold of said voltage breakdown element is about 91 volts.

5. The telephone line signature circuit according to claim 1, further comprising:
   a capacitor in parallel with said voltage breakdown element.

6. The telephone line signature circuit according to claim 1, wherein:
   said voltage breakdown element is an avalanche breakdown device.

7. The telephone line signature circuit according to claim 6, wherein said avalanche breakdown device comprises:
   a Zener diode.

8. The telephone line signature circuit according to claim 1, wherein:
   said telephone line signature circuit indicates a presence of a home network on said telephone line.

9. The telephone line signature circuit according to claim 8, wherein:
   said home network conforms substantially to a HPN standard.

10. The telephone line signature circuit according to claim 1, wherein:
    said telephone line signature circuit indicates a presence of an isolation filter on said telephone line.

11. The telephone line signature circuit according to claim 1, wherein:
    said telephone line signature circuit indicates a presence of a network interface device on said telephone line.

12. The telephone line signature circuit according to claim 1, wherein said impedance comprises:
    at least 110 Kohms resistance.

13. A method of indicating a presence of a home network device on a telephone line, comprising:
    sensing a voltage level of an injected energy signal on said telephone line; and
    if said sensed voltage level exceeds a given threshold, activating a shunt impedance across said telephone line to provide a unique signature representing said home network device.

14. The method of indicating a presence of a home network device on a telephone line according to claim 13, wherein:
    said given threshold is at least 80 volts.

15. The method of indicating a presence of a home network device on a telephone line according to claim 13, wherein said shunt impedance comprises:
    a resistance.

16. The method of indicating a presence of a home network device on a telephone line according to claim 15, wherein:
    said resistance is at least 110 Kohms.

17. The method of indicating a presence of a home network device on a telephone line according to claim 13, wherein said step of sensing said voltage level comprises:
    passing said injected energy signal through an avalanche device.

18. The method of indicating a presence of a home network device on a telephone line according to claim 17, wherein said avalanche device comprises:
    a first Zener diode.

19. The method of indicating a presence of a home network device on a telephone line according to claim 18, wherein said avalanche device further comprises:
    a second Zener diode in series with said first Zener diode, said second Zener diode being arranged in an opposite direction to said first Zener diode.

20. Apparatus for indicating a presence of a home network device on a telephone line, comprising:
    means for sensing a voltage level of an injected energy signal on said telephone line; and
    means for activating a shunt impedance across said telephone line if said sensed voltage level exceeds a given threshold to provide a unique signature representing said home network device.

21. The apparatus for indicating a presence of a home network device on a telephone line according to claim 20, wherein:
    said given threshold is at least 80 volts.

22. The apparatus for indicating a presence of a home network device on a telephone line according to claim 20, wherein said shunt impedance comprises:
    a resistance.

23. The apparatus for indicating a presence of a home network device on a telephone line according to claim 22, wherein:

said resistance is at least 110 Kohms.

24. The apparatus for indicating a presence of a home network device on a telephone line according to claim 20, wherein said means for sensing said voltage level comprises:

means for causing an avalanche voltage breakdown across said telephone line.

25. The apparatus for indicating a presence of a home network device on a telephone line according to claim 24, wherein said means for causing said avalanche voltage breakdown comprises:

a first Zener diode.

26. The apparatus for indicating a presence of a home network device on a telephone line according to claim 25, wherein said means for causing said avalanche voltage breakdown further comprises:

a second Zener diode in series with said first Zener diode, said second Zener diode being arranged in an opposite direction to said first Zener diode.

27. A home network, comprising:

a telephone line supporting at least two network devices to form a home network; and a signature device in communication with said home network, said signature device comprising a voltage breakdown element having a given breakdown threshold across said telephone line to provide a unique signature representing said home network device.

28. The home network according to claim 27, wherein:

said given breakdown threshold of said voltage breakdown element is at least 80 volts.

29. The home network according to claim 27, wherein:

said given breakdown threshold of said voltage breakdown element is about 82 volts.

30. The home network according to claim 27, wherein:

said given breakdown threshold of said voltage breakdown element is about 91 volts.

31. The home network according to claim 27, further comprising:

a capacitor in parallel with said voltage breakdown element.

32. The home network according to claim 27, wherein:

said voltage breakdown element is an avalanche breakdown device.

33. The home network according to claim 32, wherein said avalanche breakdown device comprises:

a Zener diode.

34. The home network according to claim 27, wherein:

said home networking device conforms substantially to a HPN standard.

35. The home network telephone line signature circuit according to claim 27, wherein said signature circuit further comprises:

at least 110 Kohms resistance in series with said voltage breakdown element.

* * * * *